US008823683B2

(12) United States Patent
Chung et al.

(10) Patent No.: US 8,823,683 B2
(45) Date of Patent: Sep. 2, 2014

(54) TOUCH PIXEL STRUCTURE, TOUCH PIXEL ARRAY SUBSTRATE AND TOUCH DISPLAY PANEL

(75) Inventors: Yueh-Hung Chung, Taipei (TW); Ya-Ling Hsu, New Taipei (TW); Hsueh-Ying Huang, New Taipei (TW); Yi-Ru Cheng, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 243 days.

(21) Appl. No.: 13/409,127

(22) Filed: Mar. 1, 2012

(65) Prior Publication Data

US 2013/0155024 A1 Jun. 20, 2013

(30) Foreign Application Priority Data

Dec. 16, 2011 (TW) .............................. 100146920 A

(51) Int. Cl.
*G09G 5/00* (2006.01)
*G06F 3/033* (2013.01)
*G09G 5/08* (2006.01)
*G06F 3/042* (2006.01)

(52) U.S. Cl.
USPC ........... 345/175; 345/156; 345/157; 345/173; 178/18.09

(58) Field of Classification Search
CPC ....... G06F 3/041; G06F 3/0412; G06F 3/042; G09G 3/36; G09G 2300/08; G09G 2360/14; G09G 2360/142
USPC ................................ 345/156, 157, 173–178; 178/18.01–20.04
See application file for complete search history.

(56) References Cited

U.S. PATENT DOCUMENTS

| 6,057,903 | A | * | 5/2000 | Colgan et al. ................. 349/139 |
| 7,329,848 | B2 | | 2/2008 | Shin |
| 7,675,582 | B2 | | 3/2010 | Luo et al. |
| 2006/0077186 | A1 | | 4/2006 | Park et al. |
| 2007/0051943 | A1 | | 3/2007 | Lee et al. |
| 2011/0069020 | A1 | * | 3/2011 | Kim et al. ..................... 345/173 |
| 2011/0090194 | A1 | | 4/2011 | Chang et al. |
| 2012/0026076 | A1 | * | 2/2012 | Huang et al. ................... 345/92 |
| 2012/0313881 | A1 | * | 12/2012 | Ge et al. ........................ 345/174 |

FOREIGN PATENT DOCUMENTS

| CN | 2735379 | 10/2005 |
| CN | 1776512 | 5/2006 |
| CN | 101655644 | 2/2010 |
| CN | 101794037 | 8/2010 |

OTHER PUBLICATIONS

"Office Action of China Counterpart Application", issued on Feb. 8, 2014, p. 1-p. 12.

* cited by examiner

*Primary Examiner* — Ilana Spar
(74) *Attorney, Agent, or Firm* — Jianq Chyun IP Office

(57) ABSTRACT

A touch pixel array substrate suitable for a touch display panel includes a first substrate, scan lines, data lines, signal-control lines, read-out lines, voltage-shielding lines, active devices, pixel electrodes, and photo-sensing units. The scan lines, the data lines, the signal-control lines, the read-out lines, and the voltage-shielding lines are located on the first substrate. Each of the read-out lines is located between two adjacent data lines. Each of the voltage-shielding lines is located between one of the read-out lines and one of the data lines. Both sides of each of the read-out lines are adjacent to two voltage-shielding lines. The photo-sensing units are located on the first substrate and electrically connected to the scan lines, the signal-control lines, and the read-out lines correspondingly. A touch display panel and a touch pixel structure are also provided.

19 Claims, 4 Drawing Sheets

TOUCH PIXEL STRUCTURE, TOUCH PIXEL ARRAY SUBSTRATE AND TOUCH DISPLAY PANEL

CROSS-REFERENCE TO RELATED APPLICATION

This application claims the priority benefit of Taiwan application serial no. 100146920, filed Dec. 16, 2011. The entirety of the above-mentioned patent application is hereby incorporated by reference herein and made a part of this specification.

BACKGROUND OF THE INVENTION

1. Field of the Invention

The invention relates to a touch pixel structure, a touch pixel array substrate, and a touch display panel. More particularly, the invention relates to an optical touch pixel structure, an optical touch pixel array substrate, and an optical touch display panel.

2. Description of the Related Art

A man-machine interface (MMI) is a communication medium between human beings and machine. Generally, an electronic apparatus on the market is designed with an MMI for a user to execute various functions of the electronic apparatus conveniently. Since information technologies, wireless mobile communications, and information home appliances have been rapidly developed and widely applied, touch panels have been introduced as input interfaces in replacement of conventional keyboards or mice, so as to meet current demands on portable, compact, and user-friendly electronic apparatuses, and integration of the display panels and the touch panels facilitates the MMI design.

At present, the way to integrate the touch panel and the display panel is generally categorized into two types, i.e., the plug-in type and the built-in type. When the touch panel and the display panel are integrated in the built-in manner, the electronic apparatus can be miniaturized and thinned out. Hence, the technology of installing the touch panel into the display panel has gradually drawn attention, and the technique of directly installing an optical touch panel into a display panel to form an optical touch display panel has become more mature and stable.

In most cases, the optical touch panel built in the display panel has photo-sensing units arranged in form of matrix, so as to sense whether any touch event occurs. If any of the photo-sensing units senses the touch event, the photo-sensing unit outputs a corresponding judging signal to a back-end processing circuit for initiating processing/judging actions, and thereby the electronic apparatus equipped with the optical touch display panel can perform corresponding functions.

Currently, a pixel array substrate into which the photo-sensing units are installed has read-out lines, so as to transmit the judging signal of the touch event to the back-end processing circuit. However, when the read-out lines are configured onto the pixel array substrate, signals of the read-out lines are interfered due to electrical coupling phenomenon between the read-out lines and other circuits. As such, the touch event cannot be accurately judged, which deteriorates the performance of the electronic apparatus with the optical touch display panel. Accordingly, how to improve the reliability of the pixel array substrate becomes one of the critical issues to be resolved.

SUMMARY OF THE INVENTION

The invention provides a touch pixel array substrate, a touch display panel, and a touch pixel structure characterized by favorable reliability.

In the invention, a touch pixel array substrate suitable for a touch display panel is provided, and the touch pixel array substrate includes a first substrate, a plurality of scan lines, a plurality of data lines, a plurality of signal-control lines, a plurality of read-out lines, a plurality of voltage-shielding lines, a plurality of active devices, a plurality of pixel electrodes, and a plurality of photo-sensing units. The data lines, the read-out lines, and the voltage-shielding lines are substantially disposed in parallel on the first substrate. Here, each of the read-out lines is located between two of the data lines adjacent thereto, each of the voltage-shielding lines is located between one of the read-out lines and one of the data lines, and two sides of each of the read-out lines are adjacent to two of the voltage-shielding lines. The scan lines and the signal-control lines are located on the first substrate and respectively intersect the data lines, the read-out lines, and the voltage-shielding lines. The active devices are located on the first substrate and electrically connected to the scan lines and the data lines correspondingly. The pixel electrodes are located on the first substrate and electrically connected to the active devices correspondingly. The photo-sensing units are located on the first substrate and electrically connected to the scan lines, the signal-control lines, and the read-out lines correspondingly.

In the invention, a touch display panel includes a first substrate, a plurality of scan lines, a plurality of data lines, a plurality of signal-control lines, a plurality of read-out lines, a plurality of voltage-shielding lines, a plurality of active devices, a plurality of pixel electrodes, a plurality of photo-sensing units, a second substrate, and a display medium. The data lines, the read-out lines, and the voltage-shielding lines are substantially disposed in parallel on the first substrate. Here, each of the read-out lines is located between two of the data lines adjacent thereto, each of the voltage-shielding lines is located between one of the read-out lines and one of the data lines, and two sides of each of the read-out lines are adjacent to two of the voltage-shielding lines. The scan lines and the signal-control lines are located on the first substrate and respectively intersect the data lines, the read-out lines, and the voltage-shielding lines. The active devices are located on the first substrate and electrically connected to the scan lines and the data lines correspondingly. The pixel electrodes are located on the first substrate and electrically connected to the active devices correspondingly. The photo-sensing units are located on the first substrate and electrically connected to the scan lines, the signal-control lines, and the read-out lines correspondingly. The second substrate is disposed opposite to the first substrate. The display medium is disposed between the first substrate and the second substrate.

In the invention, a touch pixel structure disposed on a first substrate is provided, and the touch pixel structure is suitable for a touch display panel and includes a scan line, a first data line, a second data line, a signal-control line, a read-out line, a first voltage-shielding line, a second voltage-shielding line, a first active device, a second active device, a first pixel electrode, a second pixel electrode, and a photo-sensing unit. The first data line, the second data line, the read-out line, the first voltage-shielding line, and the second voltage-shielding line are substantially disposed in parallel on the first substrate. The read-out line is located between the first data line and the second data line adjacent to the read-out line. The first voltage-shielding line and the second voltage-shielding line are respectively located between the read-out line and the first data line and between the read-out line and the second data line. Two sides of the read-out line are adjacent to the first voltage-shielding line and the second voltage-shielding line. The scan line and the signal-control line are located on the first substrate and respectively intersect the first data line, the second data line, the read-out line, the first voltage-shielding line, and the second voltage-shielding line. The first active device and the second active device are located on the first substrate and electrically connected to the scan line, the first data line, and the second data line correspondingly. The first pixel electrode and the second pixel electrode are located on the first substrate and electrically connected to the first active device and the second active device correspondingly. The photo-sensing unit is located on the first substrate and electrically connected to the scan line, the signal-control line, and the read-out line correspondingly.

Based on the above, each read-out line is located between two adjacent data lines, and two voltage-shielding lines are respectively located between the read-out line and two data lines. Thereby, the voltage-shielding lines are able to accomplish electromagnetic shielding effects between the read-out line and the data lines. As such, the signal transmission between the read-out line and the data lines is not interfered, thus guaranteeing favorable signal transmission performance of the touch display panel described herein.

Several exemplary embodiments accompanied with figures are described in detail below to further describe the invention in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the invention.

DETAILED DESCRIPTION OF DISCLOSED EXEMPLARY EMBODIMENTS

Figure 1:
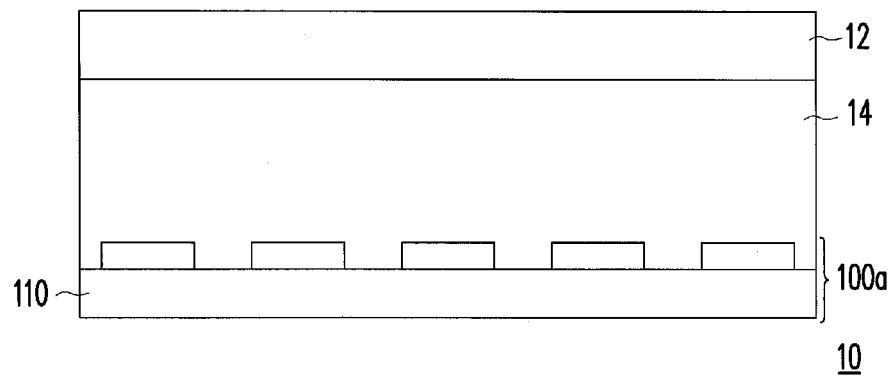
FIG. 1 is a schematic cross-sectional view illustrating a touch display panel according to an embodiment of the invention.

FIG. 1 is a schematic cross-sectional view illustrating a touch display panel according to an embodiment of the invention. With reference to FIG. 1, the touch display panel 10 described in the present embodiment includes a touch pixel array substrate 100, a second substrate 12, and a display medium 14. The first substrate 110 and the second substrate 12 are glass substrates, reinforced glass substrates, plastic substrates, flexible substrates, or composite substrates containing the above-mentioned substrates, for instance. The touch display panel 10 further includes an opposite electrode (not shown) disposed on the second substrate 12. The display medium 14 may include a non-self-illuminating material (e.g., a liquid crystal layer), an organic self-illuminating material (e.g., an organic electroluminescent layer), an inorganic self-illuminating material, or a combination thereof. Specifically, the display medium 14 may include a liquid crystal material, an electrophoretic display material, an organic light emitting diode (OLED) material, an inorganic LED material, a fluorescent material, and a phosphor material. In the present embodiment, the display medium 14 is the non-self-illuminating liquid crystal material, for instance, while equivalent modifications may be made according to other embodiments of the invention. The touch display panel of the invention may be a liquid crystal display (LCD) panel with the touch-sensing functions, e.g., a transmissive display panel, a reflective display panel, a transflective display panel, a micro reflective display panel, a vertically aligned (VA) display panel, an in-plane switch (IPS) display panel, a multi-domain vertically aligned (MVA) display panel, a twist nematic (TN) display panel, a super twist nematic (STN) display panel, a patterned-silt vertically aligned (PVA) display panel, an advance super view (ASV) display panel, a fringe field switching (FFS) display panel, a continuous pinwheel alignment (CPA) display panel, an ASM display panel, an OCB display panel, an S-IPS display panel, an axially symmetric aligned micro-cell mode (AS-IPS) display panel, an ultra-fringe field switching (UFFS) display panel, a polymer stabilized alignment (PSA) display panel, a dual-view display panel, a triple-view display panel, a three-dimensional display panel, a multi-panel display panel, a micro-capsule electrophoretic display panel, a micro-cup electrophoretic display panel, a top emission organic light emitting diode/light emitting diode (OLED/LED) display panel, a bottom emission OLED/LED display panel, a dual emission OLED/LED display panel, and so on. The material and the structure of the touch display panel are well known to people having ordinary skill in the art, and thus no further description is provided hereinafter.

Figure 2:
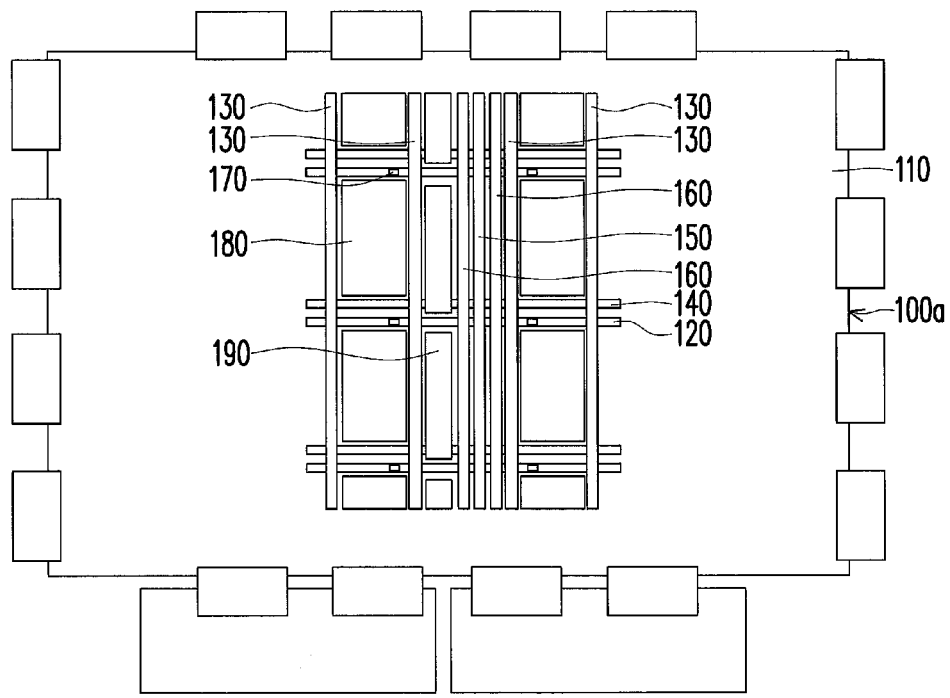
FIG. 2 is a schematic view illustrating a structure of the touch pixel array substrate depicted in FIG. 1.
Figure 3:
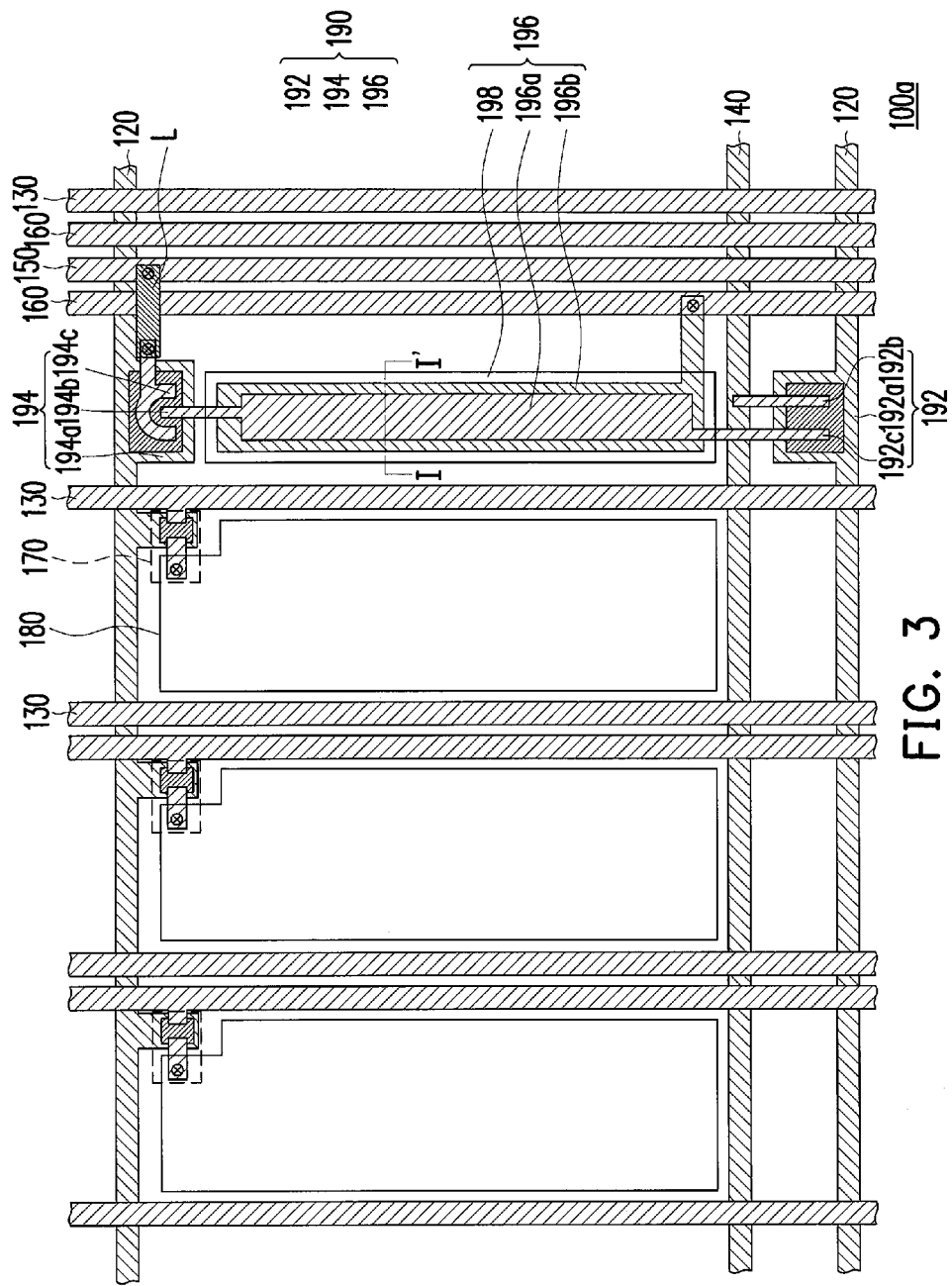
FIG. 3 is a schematic view illustrating a structure of the touch pixel structure depicted in FIG. 2.

FIG. 2 is a schematic view illustrating a structure of the touch pixel array substrate depicted in FIG. 1, and FIG. 3 is a schematic view illustrating a structure of the touch pixel structure depicted in FIG. 1. With reference to FIG. 1, FIG. 2, and FIG. 3, a touch pixel array substrate 100a described in the present embodiment includes a first substrate 110, a plurality of scan lines 120, a plurality of data lines 130, a plurality of signal-control lines 140, a plurality of read-out lines 150, a plurality of voltage-shielding lines 160, a plurality of active devices 170, a plurality of pixel electrodes 180, and a plurality of photosensitive units 190. FIG. 2 is a schematic view merely illustrating the connection correlation of components around the touch pixel structure, while the repetitive parts are omitted in FIG. 2 to avoid confusion. People having ordinary skill in the art should be able to comprehend the invention based on relevant descriptions.

The scan lines 120, the data lines 130, the signal-control lines 140, the read-out lines 150, and the voltage-shielding lines 160 are located on the first substrate 110. Here, the data lines 130, the read-out lines 150, and the voltage-shielding lines 160 are disposed in parallel on the first substrate 110. Each of the read-out lines 150 is located between two of the data lines 130 adjacent thereto, and each of the voltage-shielding lines 160 is located between one of the read-out lines 150 and one of the data lines 130. That is to say, two sides of each of the read-out lines 150 are closely adjacent to two voltage-shielding lines 160, respectively. It should be mentioned that the voltage-shielding lines 160 may be circuits to which fixed voltages are applied or ground circuits. Thereby, the voltage-shielding lines 160 are able to prevent electrical coupling from occurring between the read-out lines 150 and the data lines 130. Moreover, the read-out lines 150 are less likely to be interfered by other signal sources.

The active devices 170 are located on the first substrate 110 and electrically connected to the scan lines 120 and the data lines 130 correspondingly. The pixel electrodes 180 are located on the first substrate 110 and electrically connected to the active devices 170 correspondingly.

The photo-sensing units 190 are located on the first substrate 110 and electrically connected to the scan lines 120, the signal-control lines 140, and the read-out lines 150 correspondingly. Each of the photo-sensing units 190 is located between two of the data lines 130 adjacent thereto. Note that one photo-sensing unit 190 is controlled by two or more scan lines 120, and the cycle, the pulse width, and the voltage configuration of the scan lines 120 can be adjusted at will; therefore, the accuracy and reliability of the photo-sensing units 190 can be improved.

Each of the photo-sensing units 190 at least includes a photosensitive transistor 192, a read-out transistor 194, and a capacitor 196. The photosensitive transistor 192 at least includes a gate electrode 192a, a source electrode 192b, and a drain electrode 192c. The gate electrode 192a of the photosensitive transistor 192 is connected to one of the scan lines 120 corresponding to the gate electrode 192a, and the source electrode 192b of the photosensitive transistor 192 is connected to one of the signal-control lines 140 corresponding to the source electrode 192b. The read-out transistor 194 includes a gate electrode 194a, a source electrode 194b, and a drain electrode 194c. The gate electrode 194a of the read-out transistor 194 is connected to one of the scan lines 120 corresponding to the gate electrode 194a, and the drain electrode 194c of the read-out transistor 194 is connected to one of the read-out lines 150 corresponding to the source electrode 194c. The capacitor 196 includes a first electrode 196a and a second electrode 196b. The first electrode 196a of the capacitor 196 is connected to the source electrode 194b of the read-out transistor 194 and the drain electrode 192c of the photosensitive transistor 192, and the second electrode 196b of the capacitor 196 is connected to one of the voltage-shielding lines 160 corresponding to the second electrode 196b. Thereby, when the photo-sensing transistor 192 receives light, the photo-sensing transistor 192 generates an electronic signal input to the first electrode 196a of the capacitor 196 through the drain electrode 192c. The electronic signal is then transmitted from the first electrode 196a to the read-out transistor 194 through the source electrode 194b. At last, the electronic signal is transmitted to the read-out line 150 through the drain electrode 194c and then transmitted to a back-end processing circuit. It should be mentioned that the drain electrode 194c is electrically connected to the read-out line 150 through a conductive bridge line L.

Figure 4:
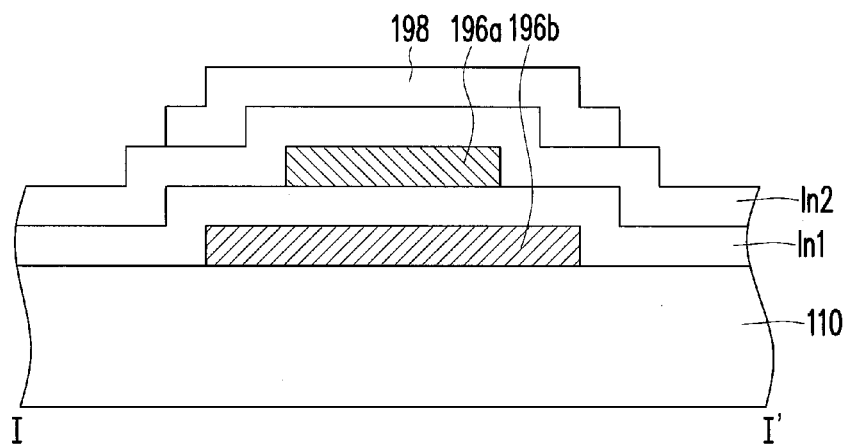
FIG. 4 is a schematic cross-sectional view taken along a section line I-I' in FIG. 3.

To elaborate the capacitor 196 in the photo-sensing unit 190, please refer to FIG. 4, which is a schematic cross-sectional view taken along a section line I-I' in FIG. 3. With reference to FIG. 3 and FIG. 4, the first electrode 196a of the capacitor 196 connected to the drain electrode 194c of the read-out transistor 194 may be sandwiched between the second electrode 196b and a third electrode 198 of the capacitor 196. Specifically, the second electrode 196b is disposed on the first substrate 110, and a first dielectric layer In1 covers the second electrode 196b. The first electrode 196a is disposed on the first dielectric layer In1, and a second dielectric layer In2 covers the first electrode 196a. The third electrode 198 is disposed on the second dielectric layer In2. In particular, the third electrode 198 is, for instance, a conductive layer simultaneously formed together with the pixel electrodes 180, and an area of the third electrode 198 may be greater than an area of the first electrode 196a. Besides, the area of the third electrode 198 may also be greater than an area of the second electrode 196b at the bottommost layer. That is to say, an orthogonal projection area of the third electrode 198 on the first substrate 110 may completely cover an orthogonal projection area of the first electrode 196a on the first substrate 110. The second electrode 196b and the third electrode 198 are electrically connected to the voltage-shielding lines 160, such that the electronic signal transmitted through the capacitor 196 is less likely to be interfered by other signals.

With reference to FIG. 3, in the touch pixel array substrate 100a, a width-to-length (channel width/channel length, W/L) ratio of an area between the source electrode 192b and the drain electrode 192c of the photosensitive transistor 192 is greater than a W/L ratio of an area between the source electrode 194b and the drain electrode 194c of the read-out transistor 194, and the channel length L refers to the distance between the source electrode and the drain electrode. As such, the electronic signal generated when the photosensitive transistor 192 is irradiated can have increased intensity. Besides, the greater the W/L ratio, the greater the manufacture uniformity of the photosensitive transistor 192.

In the touch pixel array substrate 100a of the present embodiment, the source electrode 192b and the drain electrode 192c of the photosensitive transistor 192 may be two parallel straight lines, and the drain electrode 194c of the read-out transistor 194 may be shaped as a letter U. Hence, the photosensitive transistor 192 may have a symmetrical design, and the opening of a black matrix in the touch panel for absorbing light may correspond to the symmetrical design, so as to obtain a relatively high aperture ratio. By contrast, the read-out transistor 194 may have an asymmetrical design.

Figure 5:
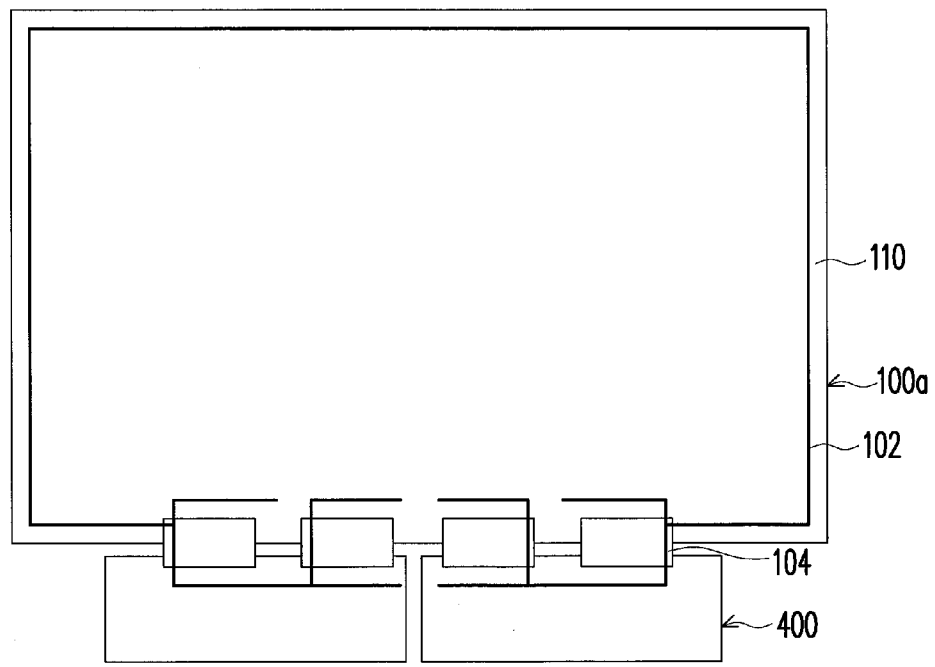
FIG. 5 is a schematic view illustrating connection between a pixel array substrate and a photo-sensing circuit board according to an embodiment of the invention.

FIG. 5 is a schematic view illustrating connection between a touch pixel array substrate and a photo-sensing circuit board according to an embodiment of the invention. With reference to FIG. 5, the touch pixel array substrate 100 of the present embodiment further includes at least one repair line 102 disposed on the first substrate 110 and extended to a photo-sensing circuit board 400 connected to the first substrate 110. For instance, the touch pixel array substrate 100 and the photo-sensing circuit board 400 are connected to each other through a circuit board 104, and therefore the repair line 102 passes through the circuit board 104 and is configured onto the photo-sensing circuit board 400. Thereby, the area occupied by the repair line 102 on the first substrate 110 can be reduced; further, the frame area can be reduced, and the glass utilization rate can be raised.

Other embodiments are given for illustration below. In the previous and following embodiments, identical reference numbers are used to represent identical or similar elements, and repetitive explanation is omitted. For a detailed description of this section, reference can be found in the previous embodiments of the invention; therefore, no further explanation is provided in the following embodiment.

Figure 6:
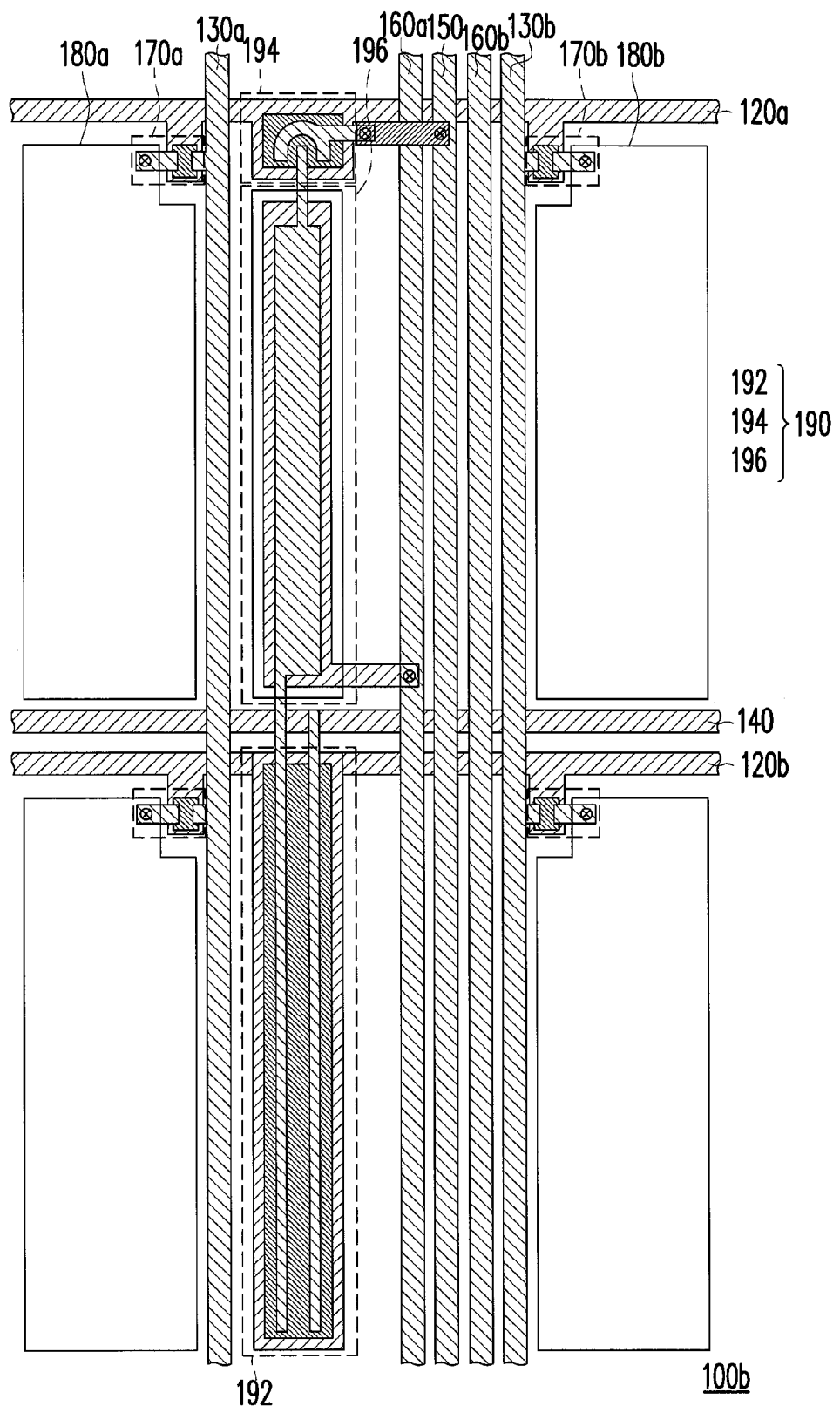
FIG. 6 is a schematic view illustrating a touch pixel structure according to another embodiment of the invention.

FIG. 6 is a schematic view illustrating a touch pixel structure according to another embodiment of the invention. With reference to FIG. 6, the touch pixel structure 100b of the invention is disposed on a first substrate (not shown) and is suitable for a touch display panel. The touch pixel structure 100b includes a first scan line 120a, a second scan line 120b, a first data line 130a, a second data line 130b, a signal-control line 140, a read-out line 150, a first voltage-shielding line 160a, a second voltage-shielding line 160b, a first active device 170a, a second active device 170b, a first pixel electrode 180a, a second pixel electrode 180b, and a photo-sensing unit 190. According to the present embodiment, the first scan line 120a, the second scan line 120b, the first data line 130a, the second data line 130b, the signal-control line 140, the read-out line 150, the first voltage-shielding line 160a, and the second voltage-shielding line 160b are located on the first substrate. The read-out line 150 is located between the first data line 130a and the second data line 130b adjacent to the read-out line 150. The first voltage-shielding line 160a and the second voltage-shielding line 160b are respectively located between the read-out line 150 and the first data line 130a and between the read-out line 150 and the second data line 130b. Two sides of the read-out line 150 are closely adjacent to the first voltage-shielding line 160a and the second voltage-shielding line 160b.

The first active device 170a and the second active device 170b are located on the first substrate and electrically connected to the first scan line 120a, the first data line 130a, and the second data line 130b correspondingly. The first pixel electrode 180a and the second pixel electrode 180b are located on the first substrate and electrically connected to the first active device 170a and the second active device 170b correspondingly. The photo-sensing unit 190 is located on the first substrate and electrically connected to the first scan line 120a, the second scan line 120b, the signal-control line 140, and the read-out line 150 correspondingly. Besides, the photo-sensing unit 190 may be located between the first data line 130a and the second data line 130b adjacent to the photo-sensing unit 190. Here, the photo-sensing unit 190 at least includes a photosensitive transistor 192, a read-out transistor 194, and a capacitor 196. When it is not necessary to densely configure the photo-sensing unit 190, the photosensitive transistor 192 and the read-out transistor 194 in the present embodiment are respectively connected to the first scan line 120a and the second scan line 120b. According to the present embodiment, the usable area of the photosensitive transistor 192 can be expanded, and the touch sensitivity of the photosensitive transistor 192 can be enhanced. Please refer to the embodiment shown in FIG. 3 for other detailed descriptions.

In light of the foregoing, in the touch pixel array substrate of the touch display panel, two sides of each read-out line are adjacent to two voltage-shielding lines, respectively. The voltage-shielding lines can thus prevent interference from other signal sources and accomplish favorable signal transmission performance. Besides, one set of photo-sensing units is controlled by two or more scan lines, and thereby the accuracy of the photo-sensing units can be improved. Moreover, the first electrode is disposed between the third electrode and the second electrode, and the third electrode can completely cover the first electrode and the second electrode. Accordingly, the touch sensing signal transmitted on the first electrode is less likely to be interfered by other signal sources. In other words, the touch display panel of the invention may have favorable reliability. Furthermore, the channel of the photosensitive transistor has the symmetrical design, while the read-out transistor has the asymmetrical design. Hence, the overall aperture ratio can be raised. In addition, the W/L ratio of the photosensitive transistor is greater than the W/L ratio of the read-out transistor. As such, the irradiation area of the photosensitive transistor can be increased, and the manufacture uniformity is satisfactory. From another perspective, the trace of the repair line is configured in the photo-sensing circuit board, and thereby the utilization rate of the substrate can be improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch pixel array substrate for a touch display panel, the touch pixel array substrate comprising:
   a first substrate;
   a plurality of data lines, a plurality of read-out lines, a plurality of first voltage-shielding lines and a plurality of second voltage-shielding lines, the data lines, the read-out lines, the first voltage-shielding lines and the second voltage-shielding lines being substantially disposed in parallel on the first substrate, wherein each of the read-out lines is located between two of the data lines, each of the first voltage-shielding lines and the second voltage-shielding lines is located between one of the read-out lines and one of the data lines, and two sides of each of the read-out lines are adjacent to one of the first voltage-shielding lines and one of the second voltage-shielding lines, respectively;
   a plurality of scan lines and a plurality of signal-control lines, the scan lines and the signal-control lines being located on the first substrate and respectively intersecting the data lines, the read-out lines, the first voltage-shielding lines and the second voltage-shielding lines;
   a plurality of active devices located on the first substrate and electrically connected to the scan lines and the data lines correspondingly;
   a plurality of pixel electrodes located on the first substrate and electrically connected to the active devices correspondingly; and
   a plurality of photo-sensing units located on the first substrate and electrically connected to the scan lines, the signal-control lines, and the read-out lines correspondingly, each of the photo-sensing units at least comprising a capacitor, the capacitor includes a first electrode and a second electrode, wherein the second electrode of the capacitor is connected to one of the first voltage-shielding lines and the second voltage-shielding lines corresponding to the second electrode of the capacitor.

2. The touch pixel array substrate as recited in claim 1, wherein each of the photo-sensing units is located between two of the data lines adjacent to the each of the photo-sensing units.

3. The touch pixel array substrate as recited in claim 1, wherein each of the photo-sensing units comprises:
   a photosensitive transistor, including a gate electrode, a source electrode and a drain electrode, the gate electrode of the photosensitive transistor being connected to one of the scan lines corresponding to the gate electrode of the photosensitive transistor, the source electrode of the photosensitive transistor being connected to one of the signal-control lines corresponding to the source electrode of the photosensitive transistor; and
   a read-out transistor, including a gate electrode, a source electrode and a drain electrode, the gate electrode of the read-out transistor being connected to one of the scan lines corresponding to the gate electrode of the read-out transistor, the drain electrode of the read-out transistor being connected to one of the read-out lines corresponding to the drain electrode of the read-out transistor, wherein the first electrode of the capacitor is connected to the source electrode of the read-out transistor and the drain electrode of the photosensitive transistor.

4. The touch pixel array substrate as recited in claim 3, wherein the capacitor further comprises a third electrode, and the first electrode of the capacitor connected to the source electrode of the read-out transistor is sandwiched between the second electrode of the capacitor and the third electrode of the capacitor.

5. The touch pixel array substrate as recited in claim 4, wherein an area of the third electrode of the capacitor is greater than an area of the first electrode of the capacitor.

6. The touch pixel array substrate as recited in claim 3, wherein a width-to-length ratio of an area between the source electrode and the drain electrode of the photosensitive transistor is greater than a width-to-length ratio of an area between the source electrode and the drain electrode of the read-out transistor.

7. The touch pixel array substrate as recited in claim 3, wherein the source electrode and the drain electrode of the photosensitive transistor include two parallel straight lines, and the drain electrode of the read-out transistor includes an U shape.

8. The touch pixel array substrate as recited in claim 1, further comprising at least one repair line disposed on the first substrate and extended to a photo-sensing circuit board connected to the first substrate.

9. A touch display panel comprising:
a first substrate;
a plurality of data lines, a plurality of read-out lines, a plurality of first voltage-shielding lines and a plurality of second voltage-shielding lines, the data lines, the read-out lines, the first voltage-shielding lines and the second voltage-shielding lines being substantially disposed in parallel on the first substrate, wherein each of the read-out lines is located between two of the data lines, each of the first voltage-shielding lines and the second voltage-shielding lines is located between one of the read-out lines and one of the data lines, and two sides of each of the read-out lines are adjacent to one of the first voltage-shielding lines and one of the second voltage-shielding lines, respectively;
a plurality of scan lines and a plurality of signal-control lines, the scan lines and the signal-control lines being located on the first substrate and respectively intersecting the data lines, the read-out lines, the first voltage-shielding lines and the second voltage-shielding lines;
a plurality of active devices located on the first substrate and electrically connected to the scan lines and the data lines correspondingly;
a plurality of pixel electrodes located on the first substrate and electrically connected to the active devices correspondingly;
a plurality of photo-sensing units located on the first substrate and electrically connected to the scan lines, the signal-control lines, and the read-out lines correspondingly, each of the photo-sensing units at least comprising a capacitor, the capacitor includes a first electrode and a second electrode, wherein the second electrode of the capacitor is connected to one of the first voltage-shielding lines and the second voltage-shielding lines corresponding to the second electrode of the capacitor;
a second substrate disposed opposite to the first substrate; and
a display medium disposed between the first substrate and the second substrate.

10. The touch display panel as recited in claim 9, wherein each of the photo-sensing units is located between two of the data lines adjacent to the each of the photo-sensing units.

11. The touch display panel as recited in claim 9, wherein each of the photo-sensing units comprises:
a photosensitive transistor, including a gate electrode, a source electrode and a drain electrode, the gate electrode of the photosensitive transistor being connected to one of the scan lines corresponding to the gate electrode of the photosensitive transistor, a source electrode of the photosensitive transistor being connected to one of the signal-control lines corresponding to the source electrode of the photosensitive transistor; and
a read-out transistor, including a gate electrode, a source electrode and a drain electrode, the gate electrode of the read-out transistor being connected to one of the scan lines corresponding to the gate electrode of the read-out transistor, a drain electrode of the read-out transistor being connected to one of the read-out lines corresponding to the drain electrode of the read-out transistor, wherein the first electrode of the capacitor is connected to the source electrode of the read-out transistor and the drain electrode of the photosensitive transistor.

12. The touch display panel as recited in claim 11, wherein the capacitor further comprises a third electrode, and the first electrode of the capacitor connected to the source electrode of the read-out transistor is sandwiched between the second electrode of the capacitor and the third electrode of the capacitor.

13. The touch display panel as recited in claim 12, wherein an area of the third electrode of the capacitor is greater than an area of the first electrode of the capacitor.

14. The touch display panel as recited in claim 11, wherein a width-to-length ratio of an area between the source electrode and the drain electrode of the photosensitive transistor is greater than a width-to-length ratio of an area between the source electrode and the drain electrode of the read-out transistor.

15. The touch display panel as recited in claim 11, wherein the source electrode and the drain electrode of the photosensitive transistor include two parallel straight lines, and the drain electrode of the read-out transistor includes an U shape.

16. The touch display panel as recited in claim 9, further comprising at least one repair line disposed on the first substrate and extended to a photo-sensing circuit board connected to the first substrate.

17. The touch display panel as recited in claim 9, wherein the display medium comprises an organic electroluminescent layer or a liquid crystal layer.

18. The touch display panel as recited in claim 9, further comprising an opposite electrode disposed on the second substrate.

19. A touch pixel structure for a touch display panel including a first substrate, the touch pixel structure comprising:
a first data line, a second data line, a read-out line, a first voltage-shielding line, and a second voltage-shielding line, the first data line, the second data line, the read-out line, the first voltage-shielding line, and the second voltage-shielding line being substantially disposed in parallel on the first substrate, wherein the read-out line is located between the first data line and the second data line, the first voltage-shielding line and the second voltage-shielding line are respectively located between the read-out line and the first data line and between the read-out line and the second data line, and two sides of the read-out line are adjacent to the first voltage-shielding line and the second voltage-shielding line;
a scan line and a signal-control line, the scan line and the signal-control line being located on the first substrate and respectively intersecting the first data line, the second data line, the read-out line, the first voltage-shielding line, and the second voltage-shielding line;
a first active device and a second active device both located on the first substrate and electrically connected to the scan line, the first data line, and the second data line correspondingly;

a first pixel electrode and a second pixel electrode both located on the first substrate and electrically connected to the first active device and the second active device correspondingly; and a photo-sensing unit located on the first substrate and electrically connected to the scan line, the signal-control line, and the read-out line correspondingly, each of the photo-sensing units at least comprising a capacitor, the capacitor includes a first electrode and a second electrode, wherein the second electrode of the capacitor is connected to one of the first voltage-shielding lines and the second voltage-shielding lines corresponding to the second electrode of the capacitor.

\* \* \* \* \*